United States Patent
Chien et al.

(10) Patent No.: US 9,691,389 B2
(45) Date of Patent: Jun. 27, 2017

(54) SPOKEN WORD GENERATION METHOD AND SYSTEM FOR SPEECH RECOGNITION AND COMPUTER READABLE MEDIUM THEREOF

(71) Applicant: INDUSTRIAL TECHNOLOGY RESEARCH INSTITUTE, Hsinchu (TW)

(72) Inventors: Shih-Chieh Chien, Taichung (TW); Chih-Chung Kuo, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 399 days.

(21) Appl. No.: 14/288,833

(22) Filed: May 28, 2014

(65) Prior Publication Data

US 2015/0269930 A1 Sep. 24, 2015

(30) Foreign Application Priority Data

Mar. 18, 2014 (TW) ............................. 103110159 A

(51) Int. Cl.
*G10L 15/00* (2013.01)
*G10L 15/26* (2006.01)
(Continued)

(52) U.S. Cl.
CPC .............. *G10L 15/28* (2013.01); *G10L 15/22* (2013.01); *G10L 15/063* (2013.01); *G10L 2015/088* (2013.01); *G10L 2015/223* (2013.01)

(58) Field of Classification Search
USPC ..... 704/231, 235, 236, 246, 270, 270.1, 275
See application file for complete search history.

(56) References Cited

U.S. PATENT DOCUMENTS 4,348,550 A * 9/1982 Pirz ...................... H04M 1/271
379/355.06
5,583,965 A * 12/1996 Douma .................. G10L 15/26
704/246
(Continued)

FOREIGN PATENT DOCUMENTS

EP 1600942 A1 11/2005
TW I224771 B 12/2004
(Continued)

OTHER PUBLICATIONS

Huang et al., "On Speaker-Independent, Speaker-Dependent, and Speaker-Adaptive Speech Recognition," Speech and Audio Processing, IEEE Transactions on (vol. 1, Issue: 2), 1993, pp. 150-157.
(Continued)

*Primary Examiner* — Olujimi Adesanya
(74) *Attorney, Agent, or Firm* — Jianq Chyun IP Office

(57) ABSTRACT

In a spoken word generation system for speech recognition, at least one input device receives a plurality of input signals at least including at least one sound signal; a mode detection module detects the plurality of input signals; when a specific sound event is detected in the at least one sound signal or at least one control signal is included in the plurality of input signals, a speech training mode is outputted; when no specific sound event is detected in the at least one sound signal and no control signal is included in the plurality of input signals, a speech recognition mode is outputted; a speech training module receives the speech training mode and performs a training process on the audio segment and outputs a training result; and a speech recognition module receives the speech recognition mode, and performs a speech recognition process and outputs a recognition result.

20 Claims, 10 Drawing Sheets

(51) Int. Cl.
*G10L 17/00* (2013.01)
*G10L 21/00* (2013.01)
*G10L 25/00* (2013.01)
*G10L 15/28* (2013.01)
*G10L 15/22* (2006.01)
*G10L 15/06* (2013.01)
*G10L 15/08* (2006.01)

(56) References Cited

U.S. PATENT DOCUMENTS

| | | | |
|---|---|---|---|
| 5,692,103 A * | 11/1997 | Lockwood | G10L 15/20 704/232 |
| 6,389,395 B1 | 5/2002 | Ringland | |
| 6,449,496 B1 * | 9/2002 | Beith | H04M 1/271 379/88.03 |
| 6,535,850 B1 * | 3/2003 | Bayya | G10L 15/07 704/239 |
| 6,587,824 B1 * | 7/2003 | Everhart | G10L 15/07 704/243 |
| 6,983,248 B1 | 1/2006 | Tahara et al. | |
| 7,243,069 B2 | 7/2007 | Jaepel et al. | |
| 1,009,325 A1 | 4/2011 | Saffer | |
| 8,364,485 B2 * | 1/2013 | Nasukawa | G10L 15/26 379/168 |
| 8,380,514 B2 | 2/2013 | Bodin et al. | |
| 8,489,390 B2 | 7/2013 | Arumugam et al. | |
| 8,521,523 B1 | 8/2013 | Garrett et al. | |
| 2001/0056344 A1 * | 12/2001 | Ramaswamy | G10L 15/22 704/235 |
| 2002/0095289 A1 * | 7/2002 | Chu | G10L 13/10 704/258 |
| 2007/0100632 A1 * | 5/2007 | Aubauer | G10L 15/22 704/275 |
| 2007/0288242 A1 * | 12/2007 | Spengler | G10L 15/20 704/275 |
| 2010/0179812 A1 * | 7/2010 | Jang | G10L 15/065 704/244 |
| 2010/0250241 A1 * | 9/2010 | Iwahashi | G10L 15/1822 704/10 |
| 2012/0095765 A1 | 4/2012 | Bodin et al. | |
| 2013/0204621 A1 | 8/2013 | Rajput et al. | |

FOREIGN PATENT DOCUMENTS

| | | |
|---|---|---|
| TW | I244638 B | 12/2005 |
| TW | I270052 B | 1/2007 |
| TW | I412019 | 10/2013 |
| WO | WO-0108135 A1 | 2/2001 |

OTHER PUBLICATIONS

Campbell, "Speaker recognition: a tutorial," Proceedings of the IEEE (vol. 85 , Issue: 9 ), 1997, pp. 1437-1462.

Abdulla et al., "Cross-words reference template for DTW-based speech recognition systems," TENCON 2003, pp. 1576-1579.

Grice et al., "Template Averaging for Adapting a Dynamic Time Warping Speech Recognizer", IBM Technical Disclosure Bulletin, vol. 32, No. 11, Apr. 1990, pp. 422-426.

Bahl et al., "A metod for the construction of acoustic Markov models for words," Oct. 1993, IEEE Transactions on Speech and Audio Processing, vol. 1, Issue 4, pp. 443-452.

Keshet et al., "Discriminative Keyword Spotting," Speech Communication, vol. 51, Issue 4, pp. 317-329, Apr. 2009, pp. 1-27.

Rabiner et al., "Voiced-unvoiced-silence detection using the Itakura LPC distance measure, Acoustics," Speech, and Signal Processing, IEEE International Conference on ICASSP '77. (vol. 2 ), pp. 323-326.

Li et al., "On designing and evaluating speech event detectors," INTERSPEECH, 2005.

Chu et al., "Environmental sound recognition with time-frequency audio features," Audio, Speech, and Language Processing, IEEE Transactions on (vol. 17 , Issue: 6) Date of Publication: Aug. 2009, pp. 1142-1157.

Chien, "MLP-Based Utterance Verification for In-Car Speech Recognition," O-COCOSDA2003.

Taiwan Patent Office, Office Action, Patent Application Serial No. TW103110159, Oct. 20, 2015, Taiwan.

\* cited by examiner

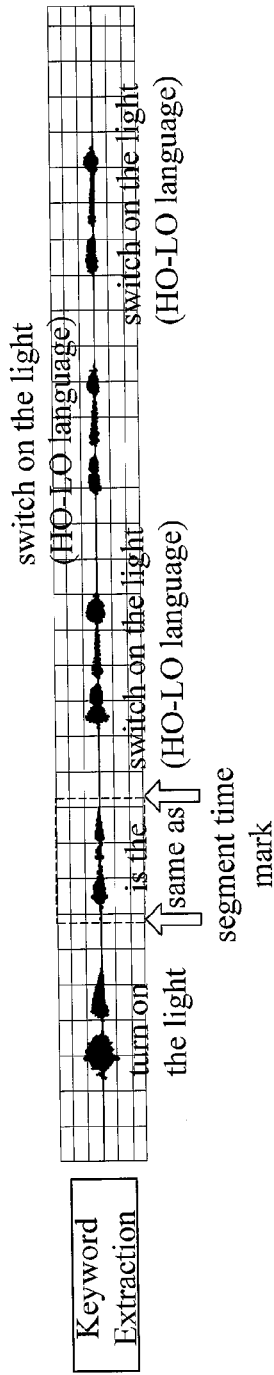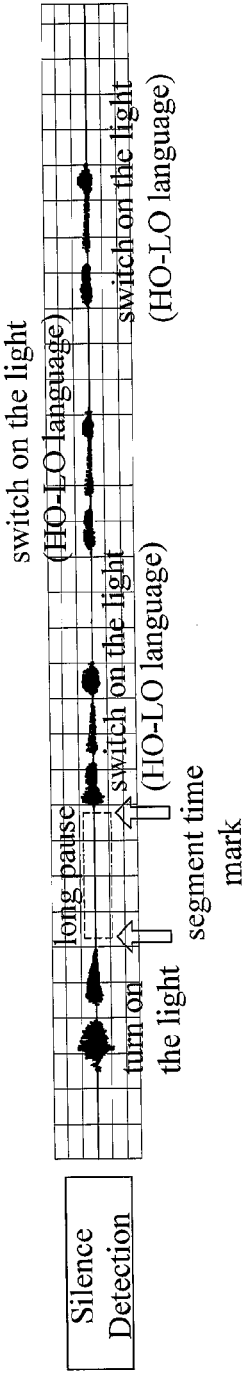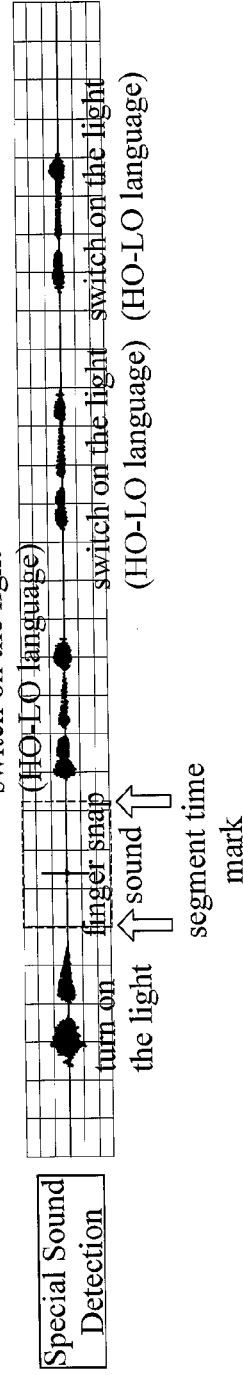

SPOKEN WORD GENERATION METHOD AND SYSTEM FOR SPEECH RECOGNITION AND COMPUTER READABLE MEDIUM THEREOF

CROSS-REFERENCE TO RELATED APPLICATION

The present application is based on, and claims priority from, Taiwan Patent Application No. 103110159 filed on Mar. 18, 2014, the disclosure of which is hereby incorporated by reference herein in its entirety.

TECHNICAL FIELD

The technical field generally relates to a spoken word generation method and system for speech recognition and computer readable medium thereof.

BACKGROUND

A speech recognition module/system often needs to preset a word set and acoustic models for the search network constructions before running, so that the search network and the acoustic model may be referenced by the speech recognition module/system during recognition. Hence, the preparation can be done before running the speech recognition module and/or system.

In actual applications, when the preset word is not the user's preferred word, or the preset language or accent of the speech recognition module and/or system is different from the user, the recognition result may be very poor. For example, a speech recognition enabled device for operating household appliances includes a Mandarin acoustic model and a word set for Taiwanese users, such as, "turn on the light", "turn on the air conditioner", and so on. However, for the user that is preferable to use Ho-Lo language or accustomed to use the phrase "light on" instead of the preset one "turn on the light", the recognition cannot work well. As a result, the user will be unwilling to use the speech recognition function. As such, some customizations or adjustments on the speech recognition enabled device are required for the user's preferences.

A technique uses a graphic interface to add new word. A spelling corresponding to the new word may be obtained by comparing against a spelling database. Then, the new word is added to the speech recognition dictionary. A word addition technique uses an ambiguity detection engine to detect whether ambiguity exists between the input word and the existent word. When no ambiguity exists, a feedback returns to the user and the engine asks the user whether the new word should be added. Another technique uses a phonetic structure to perform word element-specific mode acoustic phonetic recording, classification of word element modes and phoneme-to-grapheme conversion of word element-specific modes for the input acoustic data to generate word elements. Another technique first detects whether a substantially match exists for the input word, and if so, at least one synonym replaces the word and requests the speech input of the user intending to use the word to add the synonym. Another technique uses a microphone to character-by-character add the word and provides an operation interface for adding word.

The existing products with speech recognition capability are restricted by locality, as customization design may be made for different regions due to language or accent difference and the design may take a long time. For example, a large amount of speech data of a region can be collected to cover all kinds of possible accents and demography, the data quality can be examined and training suitable for the acoustic model of the region.

In the existing speech recognition techniques with word generation capability, some customizations are required to adapt to different regional accents, while some requirements need to preset the word set and acoustic models so that the search network and the acoustic models may be referenced by the speech recognition module/system during recognition. In actual applications, customizations or adjustments may also be required to adapt to the user's preference. Therefore, it is imperative to provide a speech recognition module and/or system able to adjust according to user demands so that the user may conveniently operate as well as reduce the cost of the solution provider.

SUMMARY

The embodiments of the present disclosure may provide a spoken word generation method and system for speech recognition and computer readable medium thereof.

An exemplary embodiment relates to a spoken word generation system for speech recognition. The system may comprise at least one input device, a mode detection module, a speech training module and a speech recognition module. The input device receives a plurality of input signals, wherein the plurality of input signals at least includes at least one sound signal. The mode detection module detects the plurality of input signals. When a specific sound event is detected in the at least one sound signal or at least one control signal is included in the plurality of input signals, the mode detection module outputs a speech training mode. When no specific sound event is detected in the at least one sound signal and no control signal is included in the plurality of input signals, the mode detection module outputs a speech recognition mode. The speech training module receives the speech training mode, performs a training process on the at least one sound signal and outputs a training result. The speech recognition module receives the speech recognition mode, performs a speech recognition process on the at least one sound signal and outputs a recognition result.

Another embodiment relates to a spoken word generation method for speech recognition. The method may comprise: receiving, by at least one input device, a plurality of input signals, and detecting, by a mode detection module, the plurality of input signals, wherein the plurality of input signals at least includes at least one sound signal; when a specific sound event being detected in the plurality of input signals or at least one control signal being included in the plurality of input signals, outputting a speech training mode and performing, by a speech training module, a training process on the at least one sound signal and outputting a training result; and when no specific sound event being detected in the plurality of input signals and no control signal being included in the plurality of input signals, outputting a speech recognition mode and performing, by a speech recognition module, a speech recognition process on the at least one sound signal and outputting a recognition result.

Yet another embodiment relates to a computer readable medium. The computer readable medium includes a plurality of instructions. When the plurality of instructions are executed, the aforementioned spoken word generation method for speech recognition is performed.

BRIEF DESCRIPTION OF THE DRAWINGS

FIG. 4A shows a schematic view of the sound event detection module performing a keyword extraction to obtain segment time marks of a specific keyword existing in an inputted segment of sound signal, in accordance with an exemplary embodiment of the disclosure.

FIG. 4B shows a schematic view of the sound event detection module performing a silence detection to obtain segment time marks of a specific silence existing in an inputted segment of sound signal, in accordance with an exemplary embodiment of the disclosure.

FIG. 4C shows a schematic view of the sound event detection module performing a special sound detection to obtain segment time marks of a specific special sound existing in an inputted segment of sound signal of the input, in accordance with an exemplary embodiment of the disclosure.

DETAILED DESCRIPTION OF THE DISCLOSED EMBODIMENTS

Figure 1:
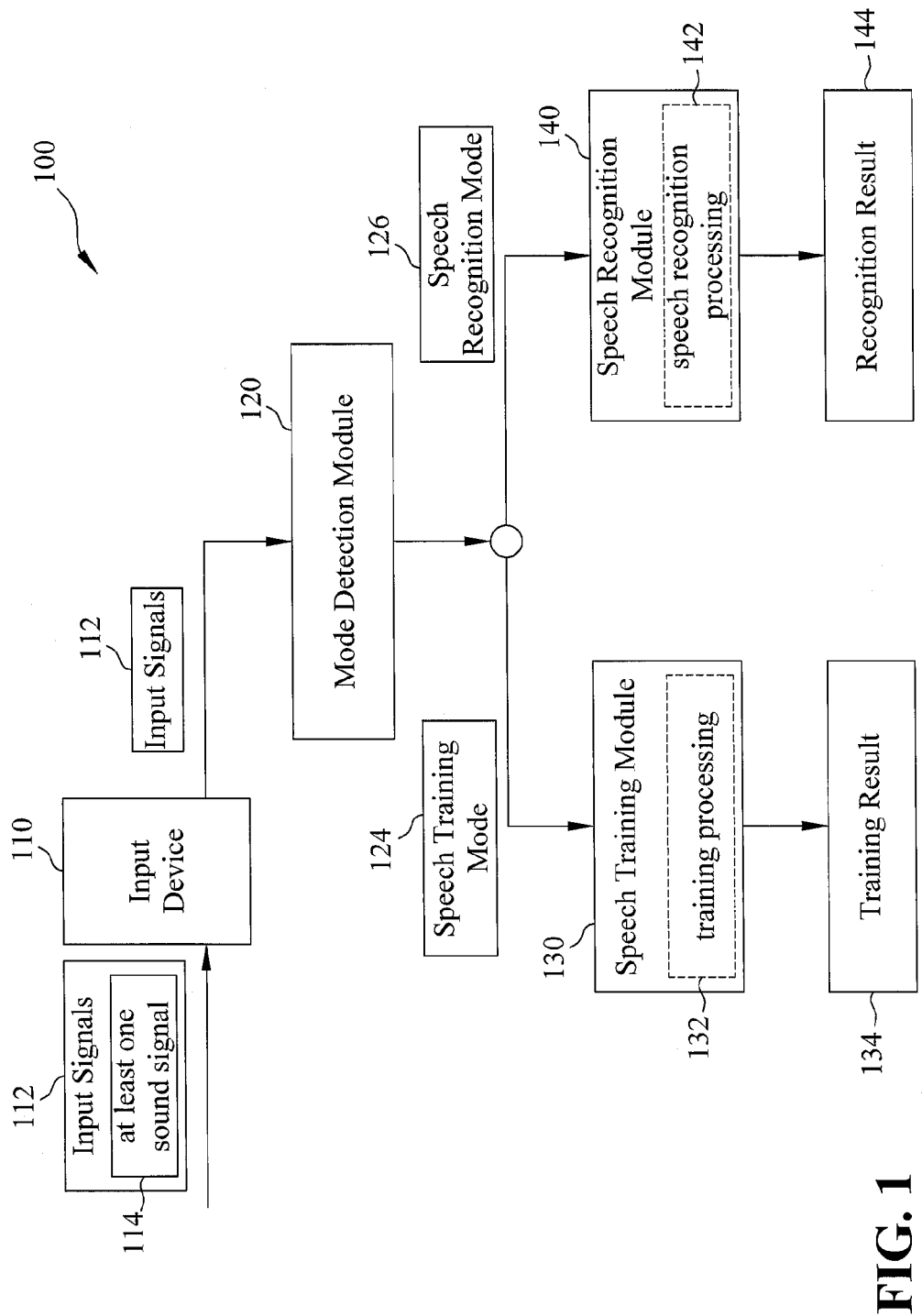
FIG. 1 shows a schematic view of a spoken word generation system for speech recognition, in accordance with an exemplary embodiment of the disclosure.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

According to the exemplary embodiments of the disclosure, a spoken word generation technique for speech recognition is provided. The technique may determine whether to perform a recognition mode or a training mode, by using a preset specific sound event or a specific control signal detection. The technique takes the speech signal of a preset word and at least one word to be added synonymous to the preset word inputted by users to train and obtain a word model synonymous to the preset word, establishes a connection to the speech recognition engine so that the users may construct their own application word for their preferences. In the exemplary embodiments of the disclosure, the recognition mode and the training mode are integrated into a single system, and the users may operate in either mode. According to the exemplary embodiments of the disclosure, the technique may integrate with a speech recognition engine so that the users in any region may add application word based on specific regional needs.

In the recognition mode, a user may speak the speech of a preset word to the speech processing unit. In the training mode, speech signal formed by a content may be inputted, wherein the content may contain a preset word, a set of preset specific sound events, and one or more repeated new words to be added to synonymously represent the preset word; alternatively, speech signal formed by a content may be inputted, wherein the content may contain the preset word, one or more repeated new words to be added to synonymously represent the preset word, and a set of preset specific control signals triggered by an external device.

FIG. 1 shows a schematic view of a spoken word generation system for speech recognition, in accordance with an exemplary embodiment of the disclosure. Referring to FIG. 1, the spoken word generation system for speech recognition 100 may comprise at least one input device 110, a mode detection module 120, a speech training module 130, and a speech recognition module 140. The input device 110 receives a plurality of input signals 112 and the plurality of input signals 112 at least includes at least one sound signal 114. The mode detection module 120 detects the plurality of input signals 112. When a specific sound event is detected in the at least one sound signal 114 or at least one control signal is included in the plurality of input signals 112, the mode detection module 120 outputs a speech training mode 124 to the speech training module 130; when the mode detection module 120 detects no specific sound event in the at least one sound signal 114 and no control signal is included in the plurality of input signals 112, the mode detection module 120 outputs a speech recognition mode 126 to the speech recognition module 140. The speech recognition module 140 performs a speech recognition process 142 on the at least one sound signal 114 and outputs a recognition result 144. The speech training module 130 performs a training process 132 on the at least one sound signal 114 and outputs a training result 134.

According to the exemplary embodiments of the disclosure, the speech training module 130 may use, for example but not limited to, at least one segment time mark existing in the at least one sound signal 114 to perform the training process 132 on the at least one sound signal 114. Based on at least one time segment of the specific sound event included in the at least one sound signal 114 or based on the at least one time segment of at least one specific control signal occurred during the time segment of the at least one sound signal 114, the mode detection module 120 may provide the at least one segment time mark to the speech training module 130. The input device 110 may use a first input device to receive the at least one sound signal 114. The input device 110 may also use a second input device to receive non-voice signal(s). The mode detection module 120 may use a sound event detection module to detect whether a preset specific sound event is included in the at least one sound signal 114 and whether the at least one time segment of the specific sound event exists in the input sound signal. The mode detection module 120 may also use a control signal detection module to detect whether a specific control signal is included in the non-voice signal(s) and whether the at least one time segment of the specific control signal occurred during the time segment of input sound signal.

Figure 2:
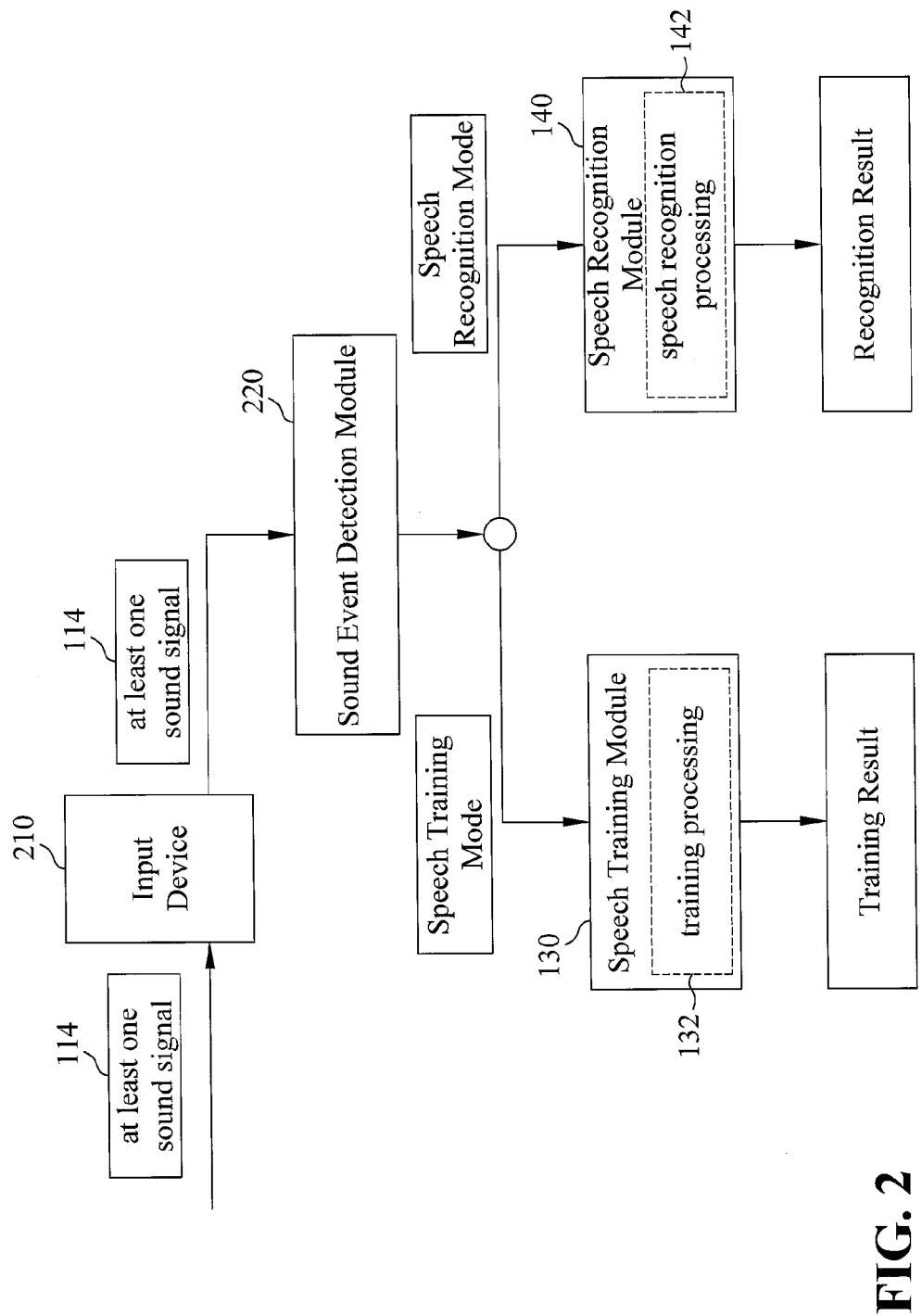
FIG. 2 shows an application exemplar of the spoken word generation system for speech recognition, in accordance with an embodiment of the disclosure.

Accordingly, FIG. 2 shows an application exemplar of the spoken word generation system for speech recognition, in accordance with an embodiment of the disclosure. In the application exemplar of FIG. 2, an input device 210 is used to receive the at least one sound signal 114. The mode detection module 120 uses a sound event detection module 220 to detect whether a preset specific sound event is included in the at least one sound signal 114 and whether the at least one time segment of the specific sound event exists in the input sound signal. When the specific sound event is included in the at least one sound signal 114, the sound event detection module 220 outputs a speech training mode and the at least one segment time mark existing in the at least one sound signal 114. The speech training module 130 uses the at least one segment time mark provided by the sound event detection module 220 to perform a training process on the at least one sound signal 114 and outputs a training result. When no specific sound event is included in the at least one sound signal 114, the sound event detection module 220 outputs a speech recognition mode; and the speech recognition module 140 performs a speech recognition processing on the at least one sound signal 114 and outputs a recognition result.

Figure 3:
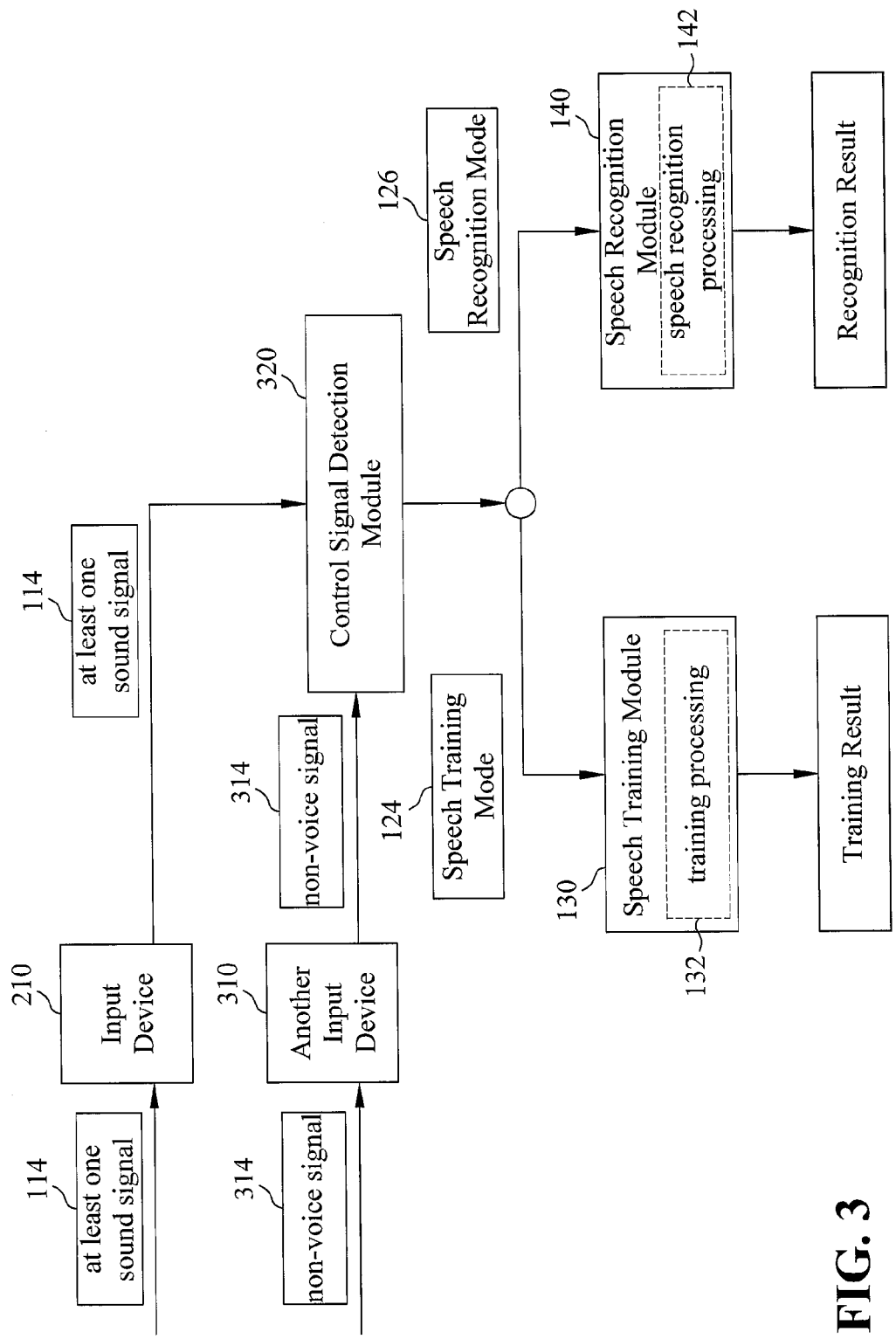
FIG. 3 shows another application exemplar of the spoken word generation system for speech recognition, in accordance with an exemplary embodiment of the disclosure.

FIG. 3 shows another application exemplar of the spoken word generation system for speech recognition, in accordance with an exemplary embodiment of the disclosure. In the application exemplar of FIG. 3, an input device 210 is used by the input device 110 to receive the at least one sound signal 114 and another input device 310 is used by the input device 110 to receive at least one non-voice signal 314. The mode detection module 120 uses a control signal detection module 320 to detect whether at least one specific control signal is included in the at least one non-voice signal 314. When the at least one specific control signal is included in the at least one non-voice signal 314, the control signal detection module 320 outputs a speech training mode; and the speech training module 130 uses the at least one segment time mark provided by the control signal detection module 320 to perform a training process on the at least one sound signal 114 and outputs a training result. When no specific control signal is included in the at least one non-voice signal 314, the control signal detection module 320 outputs a speech recognition mode; and the speech recognition module 140 performs a speech recognition processing on the at least one sound signal 114 and outputs a recognition result.

There are several implementation schemes to perform the training process on at least one sound signal. For one exemplary implementation scheme, the mode detection module 120 may detect the time segment(s) of the at least one specific control signal occurred during the at least one sound signal; the control signal detection module 320 may output at least one segment time mark for the at least one sound signal; and the speech training module 130 may perform a training process on the at least one sound signal by using the at least one segment time mark.

As aforementioned, according to the exemplary embodiments of the disclosure, in the speech recognition mode, the user may speak into an input device at least one sound signal containing a preset word, and the mode detection module 120 detects the at least one sound signal inputted by the device external to the system, and records the word speech. Because the user does not input other preset specific sound event and the mode detection module 120 does not receive any specific control signal, the at least one sound signal is transmitted to the speech recognition module 140. The speech recognition module 140 may, for example, refer to acoustic model(s) and a word set, perform a recognition and output a recognition result.

According to the exemplary embodiments of the disclosure, in the speech training mode, the mode detection module 120 may detect the at least one preset specific sound event or the at least one preset specific control signal, and obtain the at least one segment time mark for the at least one sound signal 114. The at least one sound signal 114 and the at least one specific control signal may be from different input devices. According to another embodiment of the disclosure, the at least one sound signal 114 and the at least one preset specific sound event may be from a same input device. A specific sound event may be, but not limited to a signal of a sound or speech format, such as, a specific keyword speech, a speech pause, a specific sound, and so on. The at least one specific control signal may be transmitted by an input element or device into the speech recognition system 100. The external input element or device may be, for example but not limited to, a control button or a specific sensor. In the disclosure, more application exemplars will be described in the following.

As aforementioned, the mode detection module 120 may provide both recognition mode and training mode for a user to operate. Under the recognition mode, a set of preset words are disposed for the user to operate on. Under the recognition mode, the user only needs to input the content of a preset word to the speech recognition system 100, and the speech recognition module 140 will output the recognition result after performing a speech recognition processing. For example, in a home control system integrated with the speech recognition system 100, the speech recognition system 100 provides a set of operation control words, such as, turn on the light, turn on the air conditioner, etc., for the user to operate and control the home appliances through speech. When the user speaks "turn on the light" to the home control system, the speech recognition module 140 processes to obtain the recognition result of "turn on the light", the control signal related to turning on the light is transmitted to the system to turn on the light.

When the user is not accustomed to the preset words provided by the speech recognition system 100, and wish to use other word to control the operation, such as, using "switch on the light" to synonymously represent "turn on the light", the user may use the speech training module to add at least one new word to the set of preset words provided by the speech recognition system 100. In the speech training mode, the input from the user may be under one of the following two situations. The first situation is that the user inputs the speech signal formed by a content, wherein the content may contain a preset word, a preset specific sound event, and one or more repeated new words to be added to synonymously represent the preset word. The second situation is that the user inputs the speech signal formed by a content, wherein the content may contain a preset word, at least one repeated word to be added to synonymously represent the preset word, and a preset specific control signal that may be triggered by a device.

The preset specific sound event indicated by the first situation may be, for example but not limited to, a specific keyword speech (such as, "is the same as"), a speech pause (such as, silence between 0.5 second and 1 second), a specific sound (such as, a finger snap, or a whistle or a specific music clip). The sound event detection module 220 may obtain the segment time marks of these specific sound events included in the at least one sound signal 114. For example, when the keyword speech "is the same as" is used as the specific sound event, the user may input the segment of speech signal of "turn on the light is the same as switch on the light, switch on the light, switch on the light" to add the new word "switch on the light" synonymous to the preset word "turn on the light". For another example, when a silence between 0.5 second and 1 second is used as the specific sound event, the user may input the segment of speech signal of "turn on the light . . . switch on the light, switch on the light, switch on the light" to add the new word "switch on the light" synonymous to the present word "turn on the light", wherein the " . . . " indicates the silence between 0.5 second and 1 second. Similarly, when a finger snap is used as the specific sound event, the user may input the segment of speech signal of "turn on the light Δ switch on the light Δ switch on the light, switch on the light" to add the new word "switch on the light" synonymous to the preset word "turn on the light", wherein the "Δ" indicates the finger snap sound. In another embodiment, the specific sound event is one or more signals of a sound or speech format, and at least comprises one or more combinations of one or more specific keyword speeches, one or more speech pauses, and/or one or more special sounds.

FIGS. 4A-4C show schematic views of the sound event detection module performing keyword extraction, silence detection and special sound detection, to obtain the at least one segment time mark of these specific sound events included in an inputted segment of sound signal. In the exemplar of FIG. 4A, the extracted keyword is the word "is the same as" between the word "turn on the light" and the word "switch on the light". In the exemplar of FIG. 4B, the detected silence (the long pause) falls between the word "turn on the light" and the word "switch on the light". In the exemplar of FIG. 4C, the detected special sound is the finger snap sound falls between the word "turn on the light" and the word "switch on the light".

Figure 5:
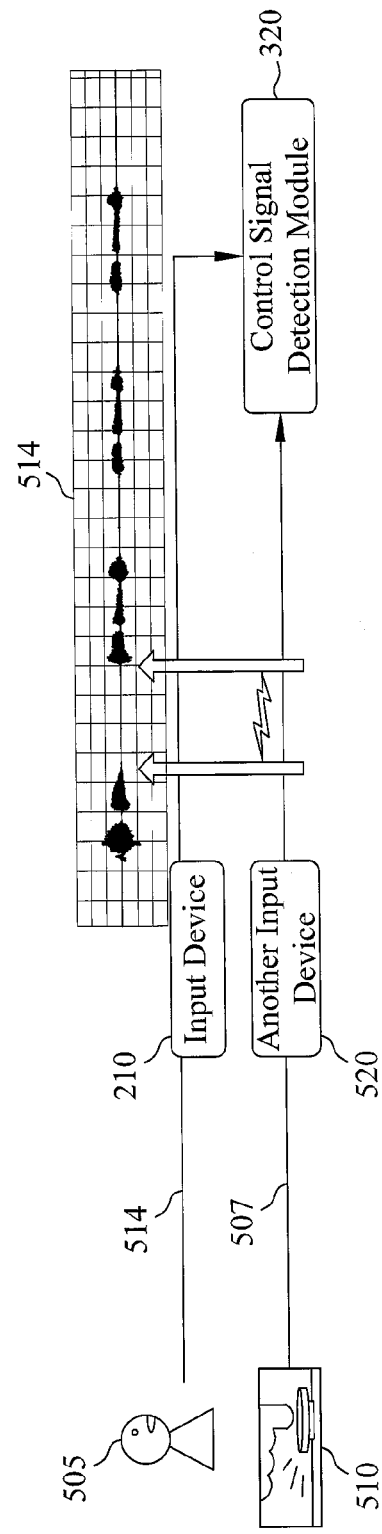
FIG. 5 shows a schematic view of the control signal detection module performing a preset control signal detection to obtain segment time marks of a preset control signal existing in at least one inputted sound signal of the input, in accordance with an exemplary embodiment of the disclosure.

The preset specific control signal triggered by a device for the second situation may be, for example but not limited to, a control signal transmitted by pressing a specific button or a specific sensor (such as, a hand gesture sensor). The control signal is a preset specific control signal indicating a training mode operation is about to be performed. For example, the user may press a button within a time duration of inputting the segment of speech signal of "turn on the light, switch on the light, switch on the light, switch on the light", or the user may press the button during a preset time duration to trigger the control signal to add the new word "switch on the light" as synonymous to the preset word "turn on the light", wherein the preset time duration is a time duration either before inputting or after inputting the segment of speech signal of "turn on the light, switch on the light, switch on the light, switch on the light". FIG. 5 shows a schematic view of the control signal detection module 320 performing the preset control signal detection to obtain at least one segment time mark of the preset control signal occurred during an inputted segment of sound signal 514, in accordance with an exemplary embodiment of the disclosure.

In the exemplar of FIG. 5, a user 505 may input a segment of sound signal into the input device 210. A preset control signal 507, for example, may be transmitted by a control button 510 or a specific sensor (not shown) to another input device 520, and then transmitted to the control signal detection module 320. The control signal detection module 320 detects the preset control signal 507 and obtains the at least one segment time mark of the preset control signal 507 occurred during the segment of sound signal.

The aforementioned operation exemplars are based on the input containing speech signal formed by a content, wherein the content may contain a preset word, or a preset specific event (sound event or specific control signal), or one or more repeated words to be added to synonymously represent the preset word, but the actual application is not limited to such. For example, in the exemplar using the finger snap sound "Δ" as a specific event, the user may also input the speech signal of "Δ switch on the light, turn on the light" to add the new word "switch on the light" as synonymous to the word "turn on the light". In other words, the specific event is not necessarily to fall at a specific location or order in the speech signal, and the word content to be trained is not necessarily to be a fixed number of words (as long as the word content contains at least one word).

In other words, according to the exemplary embodiments of the disclosure, the mode detection module 120 and the speech training module 130 may perform the training with the at least one speech signal formed by at least one preset word and one or more repeated words to be added to synonymously represent the at least one preset word inputted by the user to obtain at least one word model synonymous to the at least one preset word, and may establish a connection to the speech recognition module 140 so that the user may construct their own words for their preferences. As aforementioned, the speech recognition module 140, for example, may refer to a database formed by a plurality of acoustic models and a word set for recognition and output a recognition result. Therefore, the at least one word model obtained from the training by the speech training module 130 may be added to the plurality of acoustic models and may establish the connection between the preset word and the at least one word model to provide the speech recognition module 140 for performing a speech recognition processing.

Figure 6:
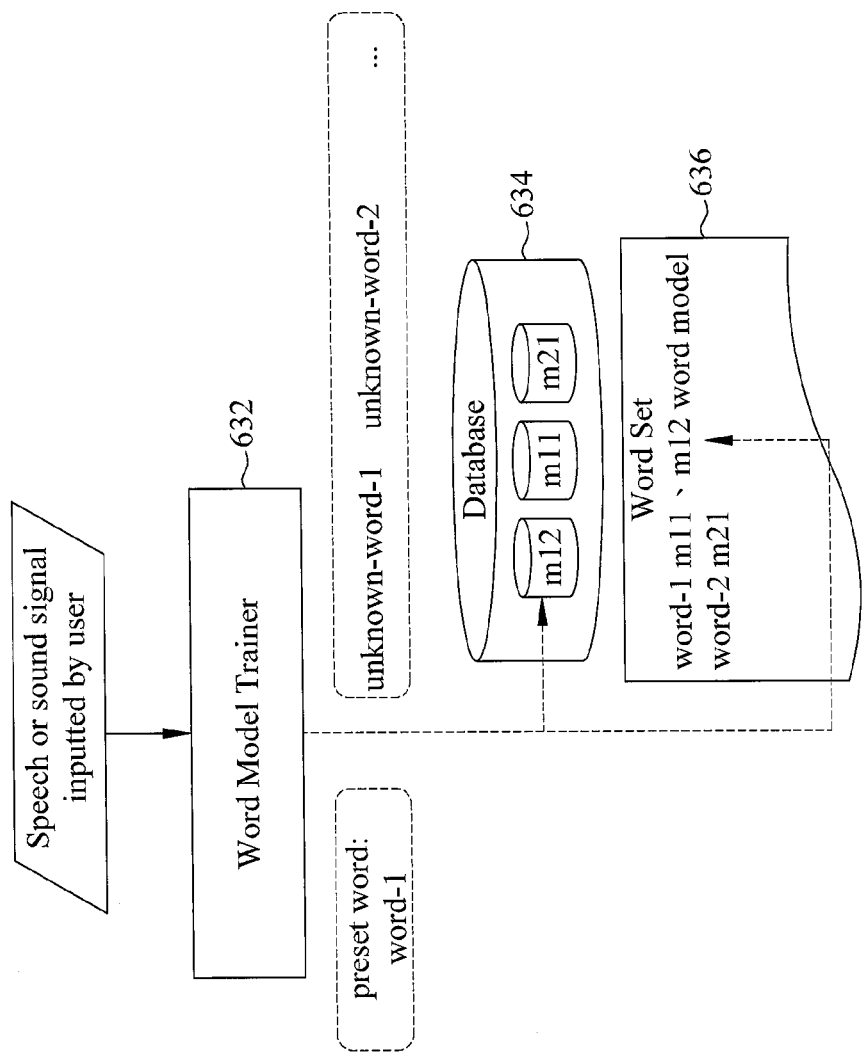
FIG. 6 shows a schematic view of an exemplar of the speech training module performing a word model training, in accordance with an exemplary embodiment of the disclosure.

FIG. 6 shows a schematic view of an exemplar of the speech training module 130 performing the word model training, in accordance with an exemplary embodiment of the disclosure. Referring to FIG. 6, the speech or sound signal inputted by the user is transmitted to a word model trainer 632 of the speech training module 130. The speech training module 130 uses the word model trainer 632 to analyze the speech or sound signal inputted by the user to obtain one or more speech segments including at least one preset word (such as, word-1) and at least one unknown word (such as, unknown-word-1 and unknown-word-2), and then the training is performed on the at least one unknown word (such as, unknown-word-1 and unknown-word-2) to obtain a word model (such as, word model m12). The word model is then added to the aforementioned database 634 formed by a plurality of acoustic models, and the connection between the at least one preset word (such as, word-1) and the word model (such as, word model m12) is established, such as, the word model (such as, word model m12) from the training being cascaded to a word model (such as, word model m11) originally corresponding to the at least one preset word (such as, word-1) in a word set 636 to provide the speech recognition module 140 for performing the speech recognition.

Figure 7:
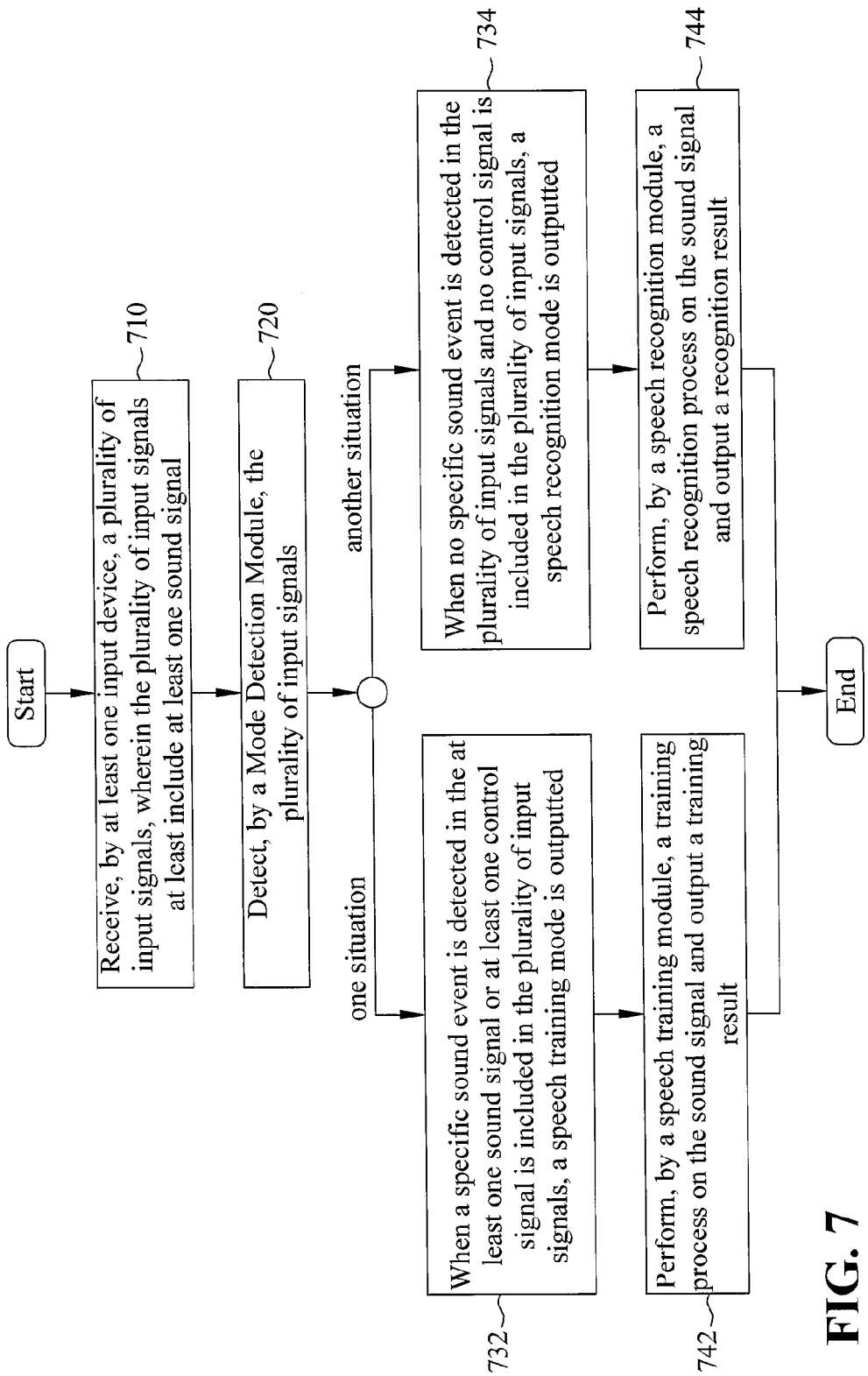
FIG. 7 shows a schematic view of a spoken word generation method for speech recognition, in accordance with an exemplary embodiment of the disclosure.

Accordingly, FIG. 7 shows a schematic view of a spoken word generation method for speech recognition, in accordance with an exemplary embodiment of the disclosure. Referring to FIG. 7, the method may receive, by at least one input device, a plurality of input signals, wherein the plurality of input signals at least include at least one sound signal (step 710); and detect, by a mode detection module, the plurality of input signals (step 720). The first possible outcome after the detection is, when a specific sound event is detected in the at least one sound signal or at least one control signal is included in the plurality of input signals, a speech training mode is outputted (step 732). After step 732, a speech training module performs a training process on the at least one sound signal and outputs a training result (step 742). In step 742, for example but not limited to, at least one segment time mark of the preset specific sound event included in the at least one sound signal is used to perform the training process on the at least one sound signal.

The other possible outcome from the detection is when no specific sound event is detected in the plurality of input signals and no control signal is included in the plurality of input signals, a speech recognition mode is outputted (step 734); after the step 734, the method may perform, by a speech recognition module, a speech recognition process on the at least one sound signal and output a recognition result (step 744).

No detailed description regarding the known techniques related to speech recognition, acoustic model, and word set is provided. For the mode detection module and the word model trainer, an exemplary embodiment is provided in the following description.

For various preset specific sound events or preset specific control signals, different embodiments may be used to implement the mode detection module for different sound or speech formats. For various preset specific sound events, the exemplars in FIGS. 4A-4C are used. Take FIG. 4A as an exemplar, when the sound event detection module 220 performs a keyword extraction, the sound event detection module 220 detects whether the preset keyword speech (such as, "is the same as") exists in the segment of sound signal and marks the left and right boundaries of the keyword speech (such as, "is the same as"). Take FIG. 4B as an exemplar, when the sound event detection module performs a silence detection, the first step is to determine whether a silence of a preset duration exists between the beginning and the ending of the segment of sound signal. Take FIG. 4C as an exemplar, when the sound event detection module 220 performs a special sound detection, the sound event detection module 220 detects whether a special sound (such as, a finger snap sound) exists in the segment of sound signal and marks the left and right boundaries of the special sound.

For various preset specific control signals, the exemplar in FIG. 5 is used as an example. The specific control signal may be a control signal transmitted from a control button or a specific sensor (such as, a hand gesture sensor) disposed outside of the system. The user triggers (such as, with a trigger signal) the specific button or sensor during, before or after, a preset duration (such as, 1 second) of inputting the speech signal containing a preset word, and one or more repeated new words to synonymously represent the preset word. The specific button or sensor has a connection interface to connect the control signal detection module 320 so that the control signal detection module 320 receives the trigger signal.

When the input is one or more signals containing a preset word, a preset specific event (sound event) or a specific control signal, and one or more repeated new words to synonymously represent the preset word, the mode detection module 120 detects the preset specific event or the preset specific control signal and obtains the speech training mode. In other words, when the user inputs a preset specific event (a sound event) or a specific control signal, the sound event detection module 220 or the control signal detection module 320 may be used to determine whether the current operation is a speech training mode, and may perform a subsequent word model training.

Figure 8:
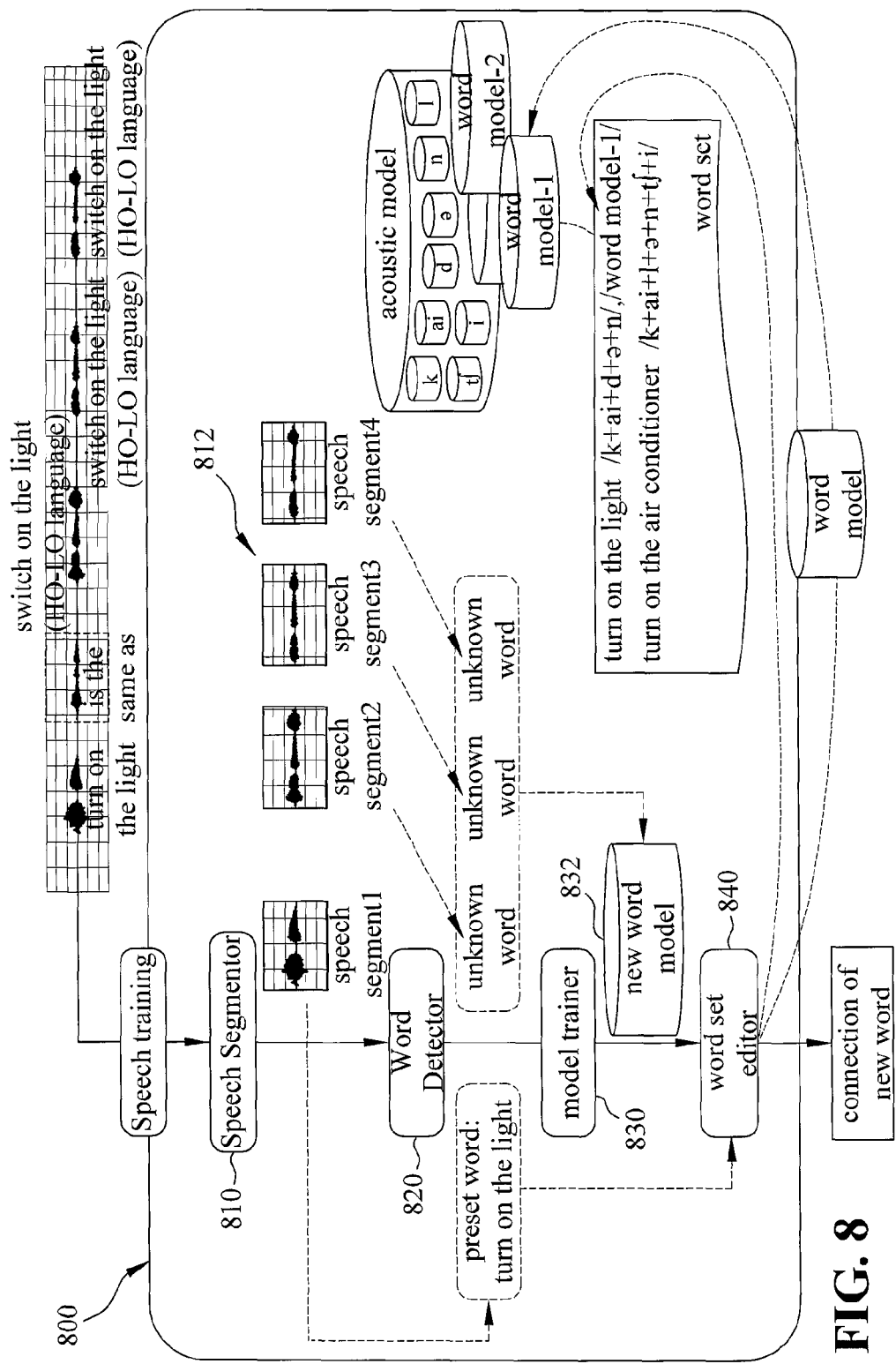
FIG. 8 shows the elements and processing flow of a word model trainer, in accordance with an exemplary embodiment of the disclosure.

FIG. 8 shows the elements and the processing flow of a word model trainer, in accordance with an exemplary embodiment of the disclosure. The word model trainer 632, as shown in FIG. 8, includes a speech segmentor 810, a word detector 820, a model trainer 830, and a word set editor 840. A word trainer 800 may refer to a database 634 formed by a plurality of acoustic models and a word set 636 to execute a speech training. The speech segmentor 810 obtains at least one speech segment 812 of the preset word and one or more speech segments of the repeated new words to synonymously represent the preset word. After obtaining the at least one speech segment, each speech segment is performed a detection by the word detector 820 to determine whether the speech segment contains a preset word and mark the speech segment accordingly, thereby obtaining a result which may include at least one speech segment marked as an unknown word and at least one speech segment marked as the preset word.

The model trainer 830 performs a training on the at least one speech segment containing at least one unknown word and obtains at least one new word model 832. Then, the word set editor 840 adds the at least one new word model to the database 634 formed by the plurality of acoustic models, and establishes a connection (in the word set 636) between the at least one preset word content and the at least one new word model so that the at least one new word may be referenced by the speech recognition module during the speech recognition. In one embodiment, the preset word content at least includes at least one model name or/and model index of at least one acoustic model corresponding to the preset word, and the at least one model name or/and model index of the at least one acoustic model may be referenced by the speech recognition module for preset word recognition. Many schemes may be used to perform the model training on the speech segment(s) of unknown word (s). One exemplary scheme to implement the model trainer is to perform a feature extraction, a syllable decision, a feature collection and a model parameter adjustment on the speech segment of the unknown word to generate the word model.

Figure 9A:
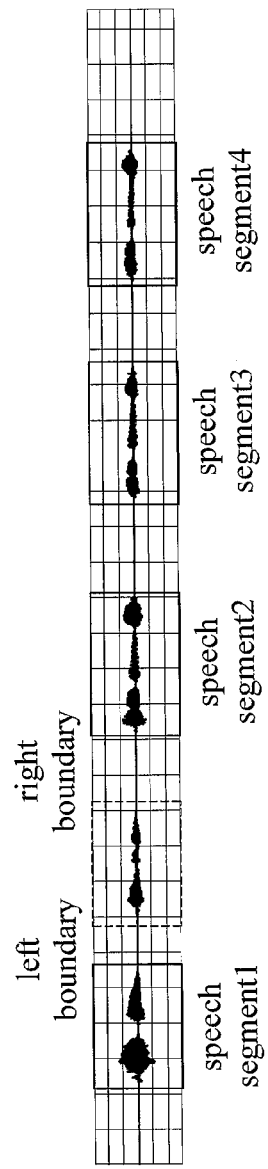
FIG. 9A shows speech segments obtained by a speech segmentation processing on the exemplars of FIG. 4A and FIG. 4C, in accordance with an exemplary embodiment of the disclosure.
Figure 9B:
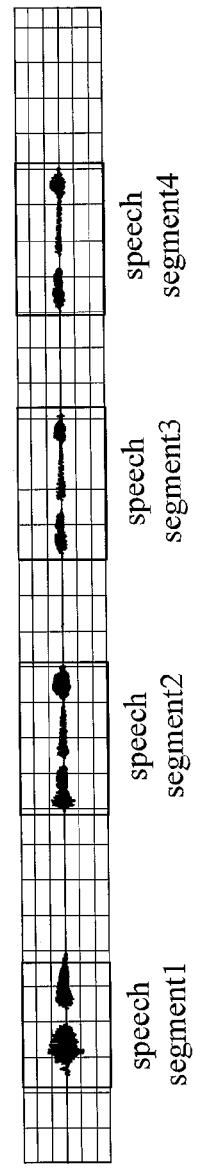
FIG. 9B shows speech segments obtained by a speech segmentation processing on the exemplar of FIG. 4B, in accordance with an exemplary embodiment of the disclosure.

According to the exemplary embodiments of the disclosure, the speech segmentor 810 may be implemented according to various preset specific sound events or control signals. For example, for exemplars in FIG. 4A or FIG. 4C, the boundaries of the keyword or special sound are marked by the sound event detection module 220, including the left boundary and the right boundary. The speech segmentor 810 may perform the speech segmentation on the left side of the left boundary and the right side of the right boundary, respectively, to obtain the speech segments shown in FIG. 9A. For example, for exemplar in FIG. 4B or FIG. 5, the received speech segment also includes a preset word and one or more repeated new word contents as well as at least one silence signal. The speech segmentor 810 can directly perform speech segmentation on the received speech signal to obtain the speech segments shown in FIG. 9B. Then, a detection is performed on the speech segments to determine whether the speech segments contain at least one preset word. The detection of a preset word is described as follows.

According to an exemplary embodiment, the word detector 820 may be implemented by a keyword extraction. By treating each preset word as a keyword and performing a word detection on each of the speech segments, to determine whether the segment is a preset word or not, the speech segments are marked accordingly. After the word detection, as shown in FIG. 4A, the speech segments are marked as preset words or unknown words, and these marks may be recorded by, such as, a speech segment collector. With the marks of the speech segments, the determination of the input format validity of the speech segments and the dispatching target is performed and outputted according to a dispatching rule. One exemplary dispatching rule is described as follows. When no segment marked as preset word is included in a speech segment, or two or more segments marked as preset word are included in the speech segments, the speech segment(s) is(/are) considered as having an invalid input format and outputs a message indicating an invalid input. When the speech segment includes only one segment marked as preset word and at least one segment marked as unknown word, the speech segment is considered as having a valid input. Then, a speech segment dispatcher is used to dispatch each segment marked as unknown word and the preset word content to a model trainer to perform a new word model training. In another embodiment, by treating each preset word as a keyword and performing a word detection on each of the speech segments, once a detection on the at least one second speech segment of the one or more repeated new words and the first speech segment of the at least one preset word, to mark each of the at least one second speech segment and first speech segment, and to obtain at least one speech segment marked as an unknown word and at least one speech segment marked as the preset word.

Another exemplary embodiment of the word detection is as follows. A speech segment is recognized by a speech recognizer to identify a possible preset word and then a word verifier is used to perform a word verification on the possible preset word to obtain a verification score. When the verification score is higher than a preset threshold, the speech segment is marked as preset word; otherwise, marked as unknown word. Then, a speech segment dispatcher is used to determine the input format validity of the speech segment and a dispatching target is performed and outputted according to the aforementioned dispatching rule.

Figure 10:
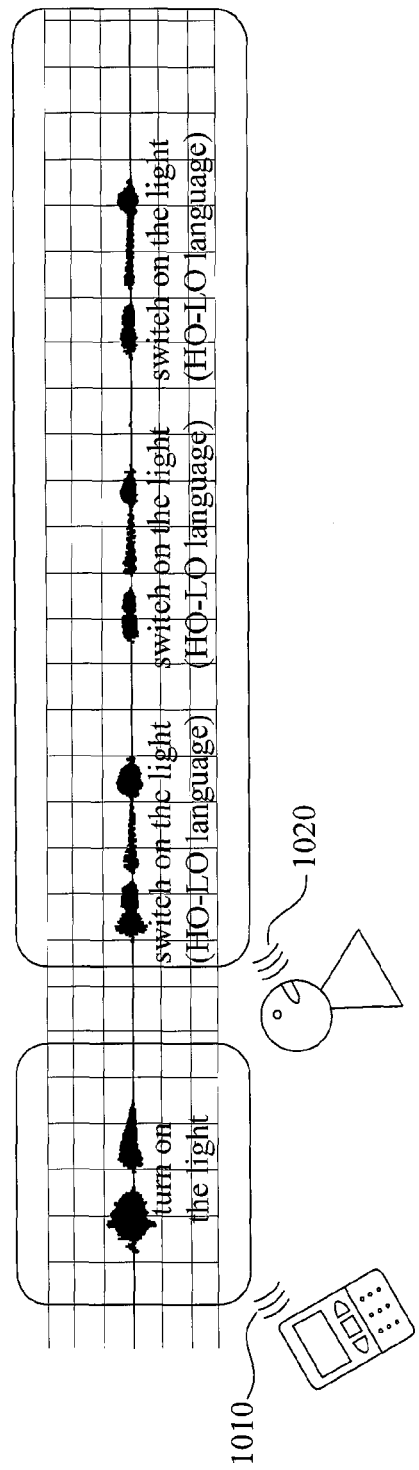
FIG. 10 shows a processing flow able to avoid the inability to successfully detect a preset word, in accordance with an exemplary embodiment of the disclosure.

As aforementioned, the mode detection module 120 may provide a recognition mode and a training mode to a user for operation. Under the training mode, the user inputs a segment of speech signal including a preset word and one or more repeated new words to synonymously represent the preset word for operation. In actual applications, the accent of the user may be unable to be accepted as the preset word by the system. In other words, during the word detection, the preset word may not be detected successfully. FIG. 10 shows an exemplar illustrating a processing flow to avoid failure detection of a preset word, in accordance with an exemplary embodiment of the disclosure. In the exemplar of FIG. 10, a pre-recorded speech recording 1010, called a golden speech, of a preset word that can be successfully detected by the word detector is prepared. When performing the operation of the training mode, the golden speech is played first (such as, turn on the light), and then the user speaks the new word to be added (such as, switch on the light), i.e., a user speech 1020, and input the new word to the spoken word generation system 100 in the disclosure. This processing flow may allow the preset word to be successfully detected in adding new word (in the training mode), thereby the one or more repeated new words to be added to synonymously represent the preset word inputted by the user may successfully train a new word model.

According to another exemplary embodiment of the disclosure, a tapping on a speech input device (such as, a microphone) may be used to determine whether an operation is in the recognition mode or in the training mode. Take the detection of a preset special sound as an example. When a microphone is not tapped on and a speech segment of the preset word is inputted, the mode detection module outputs a recognition mode. When the microphone is tapped on, the mode detection module outputs a training mode. Many schemes may be implemented for the case that the microphone is tapped on. One exemplary scheme is to input a speech segment of the preset word and then tap on the microphone, followed by inputting a speech segment of the new word. Another exemplary scheme is to tap the microphone first, followed by inputting a speech segment of the preset word, and then tap on the microphone again, followed by inputting a speech segment of the new word. Yet another exemplary scheme is to tap the microphone and input a speech segment of the preset word, followed by inputting a speech segment of the new word.

According to another exemplary embodiment, a triggering scheme or a number of triggers to a device (such as, a button) may be used to detect a preset specific control signal. Take the number of triggers as an example. When the button is triggered once and the speech is inputted, the mode detection module outputs a recognition mode. When the button is triggered once and a speech segment is inputted, followed by triggering the button again and inputting another speech segment, the mode detection module outputs a training mode, wherein the two speech segments represent the new word and the preset word, respectively. Take the triggering scheme as an example. When the button is triggered and then the speech is inputted, the mode detection module outputs a recognition mode. When the button is held and the speech is inputted at the same time, the mode detection module outputs a training mode, wherein holding the button while inputting speech may also be implemented by various schemes. One exemplary scheme is to hold the button and input a speech segment, release the button and then input another speech segment, wherein the two speech segments represent a new word and a preset word, respectively. Another exemplary scheme is to hold the button twice while inputting two speeches at the same time, wherein the two input speeches represent the new word and the preset word, respectively.

In summary, according to the exemplary embodiments of the disclosure, a spoken word generation system and method for speech recognition is provided. The technique includes a mode detection module to provide the user with two operation modes. Under the operation of the recognition mode, the user may speak the preset word into the speech processing unit. Under the operation of the training mode, a segment of speech signal including a preset word, a set of preset specific sound events, and one or more repeated new words may be inputted, or a segment of speech signal including a preset word and the one or more repeated new words, and a set of specific control signals triggered by an external device may be inputted. The technique provides the spoken word generation system and method able to be integrated with a speech recognition engine, thereby allowing the users or regional clients may add one or more application words to meet their requirements.

The aforementioned spoken word generation method for speech recognition may be implemented by instructions of a computer readable medium. When a computer reads the instructions of the computer readable medium, the computer may execute the aforementioned spoken word generation method for speech recognition. The computer readable medium may be, but not limited to such as soft disk, hard disk, compact disk (CD), Compact Disk-Read Only Memory (CD-ROM), CD-RW, ROM, RAM, EPROM, EEPROM or flash memory. The computer may be, but not limited to such as a processing platform or device/system, a computing platform or a device/system.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A spoken word generation system for speech recognition, comprising:
    at least one input device that receives a plurality of input signals, wherein the plurality of input signals at least includes at least one sound signal;
    a mode detection module that detects the plurality of input signals, when a specific sound event is detected in the at least one sound signal or at least one control signal is included in the plurality of input signals, the mode detection module outputs a speech training mode; when no specific sound event is detected in the at least one sound signal and no control signal is included in the plurality of input signals, the mode detection module outputs a speech recognition mode;
    a speech training module that receives the speech training mode, performs a training process on the at least one sound signal and outputs a training result; and
    a speech recognition module that receives the speech recognition mode, performs a speech recognition process on the sound signal and outputs a recognition result,
    wherein the system uses the mode detection module and the speech training module to train at least one word model synonymous to at least one preset word by marking left and right boundaries of the specific sound event or the at least one control signal as to indicate the at least one preset word and at least one new word to be added synonymous to the at least one preset word inputted by at least one user and to establish a connection between the at least one word model and the at least one preset word for the speech recognition module,
    wherein a computer executes the functions of the above modules.

2. The system as claimed in claim 1, wherein one of the at least one input device receives the at least one sound signal, and the mode detection module uses a sound event detection module to detect whether the specific sound event is included in the at least one sound signal.

3. The system as claimed in claim 1, wherein the at least one input device further includes a first input device to receive the at least one sound signal, and a second input device to receive at least one non-voice signal, and the mode detection module further includes a control signal detection module to detect whether at least one specific control signal is included in the at least one non-voice signal.

4. The system as claimed in claim 2, wherein when the specific sound event is detected in the at least one sound signal, the sound event detection module outputs the speech training mode; and when no specific sound event is detected in the at least one sound signal, the sound event detection module outputs the speech recognition mode.

5. The system as claimed in claim 3, wherein when the at least one specific control signal is detected in the at least one non-voice signal, the control signal detection module outputs the speech training mode; and when no specific control signal in the at least one non-voice signal is detected, the control signal detection module outputs the speech recognition mode.

6. The system as claimed in claim 1, wherein the mode detection module provides the speech recognition mode and the speech training mode for at least one user to input or operate.

7. The system as claimed in claim 6, wherein under the training mode, a first situation for the at least one user is to input at least one speech signal formed by a preset word, a preset specific sound event and one or more repeated new words; and a second situation for the at least one user is to input the at least one speech signal formed by the preset word and the one or more repeated new words, and uses a device to trigger a specific control signal.

8. The system as claimed in claim 1, wherein the specific sound event is one or more signals of a sound or speech format, and at least comprises one or more combinations of one or more specific keyword speeches, one or more speech pauses, and one or more special sounds.

9. The system as claimed in claim 1, wherein the at least one control signal is transmitted from an external input element or device to the system.

10. The system as claimed in claim 1, wherein the speech training module uses a word model trainer to analyze the plurality of input signals to obtain at least one preset word and a speech segment containing at least one unknown word, and perform a training on the speech segment containing the at least one unknown word, thereby obtaining at least one word model, and then add the at least one word model to a database formed by a plurality of acoustic models, and establish a connection between the at least one preset word and the at least one word model.

11. The system as claimed in claim 1, wherein the at least one preset word is to the left boundary of the specific sound event, or the at least one control signal, and the at least one new word to be added synonymous to the at least preset word is to the right boundary of the specific sound event.

12. A spoken word generation method for speech recognition, executed by a computer, comprising:
    receiving, by at least one input device, a plurality of input signals, and detecting, by a mode detection module, the plurality of input signals, wherein the plurality of input signals at least includes at least one sound signal;
    when a specific sound event being detected in the plurality of input signals or at least one control signal being included in the plurality of input signals, outputting a speech training mode and performing, by a speech training module, a training process on the at least one sound signal and outputting a training result; and
    when no specific sound event being detected in the plurality of input signals and no control signal being included in the plurality of input signals, outputting a speech recognition mode and performing, by a speech recognition module, a speech recognition process on the at least one sound signal and outputting a recognition result, training at least one word model synonymous to at least one preset word by marking left and right boundaries of the specific sound event or the at least one control signal as to indicate the at least one preset word and at least one new word to be added synonymous to the at least one preset word inputted by at least one user and establishing a connection between the at least one word model and the at least one preset word.

13. The method as claimed in claim 12, wherein the method further includes:

analyzing, by a word model trainer, a plurality of speech or sound signals of the plurality of input signals, thereby obtaining the at least one preset word and a speech segment containing at least one unknown word; and performing a training on the speech segment containing the at least one unknown word, thereby obtaining the at least one word model, and establishing a connection between the at least one preset word and the at least one word model.

14. The method as claimed in claim 13, wherein the method further includes:

using a speech segmentor of the word model trainer to obtain a first speech segment of the at least one preset word and at least one second speech segment of one or more repeated new words to synonymously represent the at least one preset word.

15. The method as claimed in claim 14, wherein the method further includes:

performing respectively, by a word detector, a detection on the at least one second speech segment of the one or more repeated new words and the first speech segment of the at least one preset word, and marking each of the at least one second speech segment and the first speech segment, thereby obtaining at least one speech segment marked as an unknown word and at least one speech segment marked as the preset word.

16. The method as claimed in claim 15, wherein the method further includes:

performing, by a model trainer, a model training on the at least one speech segment marked as the unknown word, and obtain at least one new word model.

17. The method as claimed in claim 16, wherein the method further includes:

adding, by a word set editor, the at least one new word model to a database formed by a plurality of acoustic models; and establishing, in a word set, a connection of the at least one new word model according to the at least one preset word included in at least one preset word content so that the new word model being referenced by the speech recognition module during the speech recognition process, wherein the at least one preset word content includes at least one model name or model index of the plurality of acoustic models corresponding to the preset word, and the at least one model name or model index of the plurality of acoustic models is referenced by the speech recognition module for a preset word recognition.

18. The method as claimed in claim 12, wherein the method uses a number of triggers or a triggering scheme of a device to detect whether the at least one control signal is included in the plurality of input signals.

19. The method as claimed in claim 12, wherein the method further includes:

determining, by the mode detection module, to output the speech recognition mode or the speech training mode by detecting whether or not tapping on a speech input device.

20. A non-transitory computer readable medium, comprising a plurality of instructions, wherein the plurality of instructions are executed by a computer to perform the spoken word generation method for speech recognition as claimed in claim 12.

* * * * *